US006872758B2

(12) United States Patent
Simpson et al.

(10) Patent No.: US 6,872,758 B2
(45) Date of Patent: Mar. 29, 2005

(54) POLYURETHANE FOAMS AND METHOD OF MANUFACTURE THEREOF

(75) Inventors: Scott S. Simpson, Woodstock, CT (US); Sujatha Narayan, Putnam, CT (US); Michael Lunt, Abington, CT (US)

(73) Assignee: World Properties, Inc., Lincolnwood, IL (US)

( * ) Notice: Subject to any disclaimer, the term of this patent is extended or adjusted under 35 U.S.C. 154(b) by 125 days.

(21) Appl. No.: 10/033,540

(22) Filed: Dec. 26, 2001

(65) Prior Publication Data

US 2002/0122929 A1 Sep. 5, 2002

Related U.S. Application Data

(60) Provisional application No. 60/258,403, filed on Dec. 27, 2000.

(51) Int. Cl.[7] ............................................. C08G 18/28
(52) U.S. Cl. ...................... 521/170; 521/172; 521/173; 521/174
(58) Field of Search .................. 521/170, 172, 521/173, 174

(56) References Cited

U.S. PATENT DOCUMENTS

| | | | |
|---|---|---|---|
| 2,591,884 A | 4/1952 | Simon et al. | |
| 2,602,783 A | 7/1952 | Simon et al. | |
| 2,621,166 A | 12/1952 | Schmidt et al. | |
| 2,698,838 A | 1/1955 | Simon et al. | |
| 2,729,618 A | 1/1956 | Muller et al. | |
| 2,779,689 A | 1/1957 | Reis ........................... | 117/104 |
| 2,808,391 A | 10/1957 | Pattison | |
| 2,811,493 A | 10/1957 | Simon et al. | |
| 2,833,730 A | 5/1958 | Barthel, Jr. | |
| 2,834,748 A | 5/1958 | Bailey et al. | |
| 2,846,458 A | 8/1958 | Haluska | |
| 2,850,476 A | 9/1958 | Seeger et al. | |
| 2,866,762 A | 12/1958 | Brochhagen et al. | |
| 2,866,774 A | 12/1958 | Price | |
| 2,868,824 A | 1/1959 | Haluska | |
| 2,870,097 A | 1/1959 | Pattison | |
| 2,877,212 A | 3/1959 | Seligman | |
| 2,878,601 A | 3/1959 | Burmeister et al. | |
| 2,902,473 A | 9/1959 | Smith | |
| 2,911,390 A | 11/1959 | Smith | |
| 2,917,480 A | 12/1959 | Bailey et al. | |
| 2,921,915 A | 1/1960 | Brochhagen et al. | |
| 3,057,901 A | 10/1962 | Plueddemann | |
| 4,129,697 A | 12/1978 | Schapel et al. | |
| 4,508,774 A | 4/1985 | Grabhoefer et al. | |
| 4,513,518 A | 4/1985 | Jalbert et al. .................... | 35/44 |
| 4,621,113 A | 11/1986 | Collins ........................ | 524/196 |
| 4,741,951 A | 5/1988 | Ricciardi et al. ........ | 428/316.6 |
| 4,757,096 A | 7/1988 | Berthevas et al. | |
| 4,778,717 A | 10/1988 | Fitchmun | |
| 4,845,862 A | 7/1989 | Phillips, Jr. et al. | |
| 5,095,570 A | 3/1992 | Bar et al. | |
| 5,134,014 A | 7/1992 | Zaima et al. | |
| 5,203,793 A | 4/1993 | Lyden | |
| 5,289,644 A | 3/1994 | Driskill et al. | |
| 5,312,848 A | 5/1994 | Klapper et al. ............. | 521/172 |
| 5,432,204 A | 7/1995 | Farkas ........................ | 521/49 |
| 5,565,498 A * | 10/1996 | Chaffanjon et al. ......... | 521/155 |
| 5,668,189 A | 9/1997 | Farkas ........................ | 521/137 |
| 5,714,229 A | 2/1998 | Ogden ........................ | 428/138 |
| 5,727,336 A | 3/1998 | Ogden ........................... | 36/43 |
| 5,733,945 A | 3/1998 | Simpson ..................... | 521/124 |
| 5,753,357 A | 5/1998 | Filipitsch et al. ........ | 428/307.7 |
| 5,763,335 A | 6/1998 | Hermann .................... | 442/370 |
| 5,859,081 A | 1/1999 | Duffy ......................... | 521/133 |
| 5,900,442 A | 5/1999 | Leenslag et al. ............ | 521/174 |
| 5,922,781 A | 7/1999 | St. Clair et al. ............ | 521/170 |
| 5,973,016 A | 10/1999 | St. Clair et al. ............ | 521/129 |
| 5,985,383 A | 11/1999 | Allen et al. ................ | 428/34.1 |
| 5,994,245 A | 11/1999 | Marier et al. ............... | 442/373 |
| 6,020,390 A | 2/2000 | Leenslag .................... | 521/155 |
| 6,020,391 A | 2/2000 | Leenslag .................... | 521/155 |
| 6,025,287 A | 2/2000 | Hermann .................... | 442/370 |
| 6,034,149 A | 3/2000 | Bleys et al. ................. | 521/155 |
| 6,043,292 A | 3/2000 | Huygens et al. ............ | 521/133 |
| 6,048,810 A | 4/2000 | Baychar ..................... | 442/370 |
| 6,417,241 B1 * | 7/2002 | Huygens et al. ............ | 521/137 |

FOREIGN PATENT DOCUMENTS

| | | |
|---|---|---|
| CA | 2071030 | 6/1992 |
| EP | 0 317 040 A2 | 11/1987 |
| EP | 0 918 065 A1 | 5/1999 |
| FR | 2 548 903 | 6/1983 |
| GB | 733624 | 7/1955 |
| GB | 2 327 681 A | 2/1999 |

OTHER PUBLICATIONS

International Search Repor; PCT/US 01/49566; Date mailed: Mar. 31, 2002; 7 pages.

David J. Kelly and John R. Rucker; "New Polyurethane Polymers for Energy Absorbing Automotive Applications"; International Congress & Exposition, Detroit, Michigan, Feb. 24–27, 1997; pp. 85–89.

J.R. Stoll and Dietrich G. Schlotterbeck; "Headliners and Other Interior Trim Parts Made of Thermoformable Urethane Foam Core Sandwiches"; International Congress and Exposition, Detroit, Michigan, Feb. 26–Mar. 2, 1990; pp. 2–3, 5, 7 and 9.

(Continued)

Primary Examiner—John M. Cooney, Jr.
(74) Attorney, Agent, or Firm—Cantor Colburn LLP

(57) ABSTRACT

A thermoformable polyurethane foam having excellent compression set resistance, and a thermoformable polyurethane foam having excellent compression set resistance and shape retention under load. In another embodiment, at least one additional layer of a polyurethane foam is integrally bonded to the thermoformable foam. A moisture management system for polyurethane foams is also described. The foams have particular utility as shoe sole inserts.

20 Claims, 2 Drawing Sheets

OTHER PUBLICATIONS

Tsuneo Asano, Isao Kamoshita and Hirotaka Wada; "Thermoformable Flexible Polyurethane Slabstock Foam"; UTECH Asia '95; Paper 8; pp. 1–4, 1995.

D.L. Fair; "Formable Polyurethane Foam Composites for Automotive Applications"; POLYURETHANE 1995, Sep. 26–29, 1995; pp. 427–430.

"BASF readies polymers slate for diverse end-use markets"; Modern Plastics International, Aug. 1995; pp. 87–88.

I. Dolgopolsky and J.A. Duley; "Polyurethane Foam as an Integral 'Core' Component of Automotive Headliner"; Polyurethanes Expo 99; Innovation for the Next Millennium; Walt Disney World Dolphin, Orlando, Florida, Sep. 12th–15th, 1999; Technical Session H—Automotive II; pp. 395–402.

* cited by examiner

Figure 3: Time-Temperature study on the thermoforming process

POLYURETHANE FOAMS AND METHOD OF MANUFACTURE THEREOF

CROSS REFERENCE TO RELATED APPLICATION

This application claims the benefits of U.S. Provisional Patent Application Ser. No. 60/258,403, filed Dec. 27, 2000, which is incorporated herein by reference in its entirety.

BACKGROUND OF THE INVENTION

1. Field of the Invention

This invention relates generally to polyurethane foams. More particularly, this invention relates in one embodiment to polyurethane foams that are thermoformable at elevated temperatures, and have good low temperature and/or room temperature compression set resistance. In another embodiment, this invention relates to thermoformable polyurethane foams having moisture management properties. Such thermoformable and moisture managing foams may be used in single or dual layer constructions.

2. Description of the Related Art

Conventional polyurethane foams, for example the PORON® foams manufactured by Rogers Corporation, may be formulated to provide an excellent range of properties, including compression set resistance, even at higher temperatures. Foams with good compression set resistance provide cushioning, and maintain their original shape or thickness under loads for extended periods. Most polyurethane foams are thermosetting compositions, and are therefore not thermoformable, meaning they cannot be molded or formed at temperatures below that at which degradation occurs. In contrast, typical thermoformable materials can be shaped at elevated temperatures, but exhibit poor compression set resistance even at room temperatures. Products made from these materials have a shorter product life over which the cushioning and ability to maintain their initial shape is good.

Known thermoformable polyurethane foams suffer from the same drawbacks. One method for obtaining a thermoformable polyurethane foam is by the addition of powdered, rigid, thermoplastic polymers to polyurethane froth foams. U.S. Pat. Nos. 5,432,204 and 5,668,189, for example, teach that thermosensitive fillers and microwave sensitive powders impart some thermoformability when added to foam prepared from polyisocyanate, water, catalyst, and polyol.

U.S. Pat. No. 4,508,774 discloses cellular polyester-urethane foams having a density of between 15 to 400 $Kg/m^3$ (0.9–24 $lb/ft^3$) formed by pressing an initial foam having a density of between 15 to 40 $Kg/m^3$ (0.9–2.4 $lb/ft^3$) at temperatures of between 140° C. and 200° C. The initial foam is the reaction product of a mixture of diphenylmethane diisocyanates and polyphenyl-polymethylene polyisocyanates with a polyester polyol under foaming conditions. The polyester polyol is required to be at least 55 percent by weight of the polyol component. Due to its high degree of sound absorption, the foam is shaped into panels and used for headliners and trim panels in automobiles.

U.S. Pat. No. 4,757,096 discloses the formation of polyurethane foam containing either an aromatic amine or an alkoxylated bisphenol, a chain extender that imparts the property of thermoformability to a cured polyurethane froth foam. The shape retention of the foam is enhanced with the addition of a second chain extender, but the thermoformability is then compromised.

Conventional hydrophilic or moisture managing foams are typically formulated from a hydrophilic polyurethane formulation and large amounts of water used for blowing. Typically these foams have very poor physical properties and compression set resistance, which renders them ineffective as cushioning materials. In contrast, polyurethane foams, for example the PORON® foams manufactured by Rogers Corporation with very high compression set resistance and excellent cushioning properties typically exhibit low water absorption.

Hydrophilic, flexible polyurethane foams that retain a compressed form are disclosed in U.S. Pat. No. 6,034,149. The foam is made of water reacted with a prepolymer. The prepolymer is made by reacting excess polyisocyanate with a polyether polyol, the polyol having an average nominal hydroxyl functionality of 2 to 6. These hydrophilic foams are used as diapers, sponges, and wound dressings. U.S. Pat. No. 6,034,149 does not teach how to attain thermoformable foam having both thermoformability and shape retention and good compression set resistance properties.

Composite materials for absorbing and dissipating body fluids and moisture are disclosed in U.S. Pat. No. 5,763,335. The foam layer is established by combining an aqueous mixture including the sorbent in a pre-determined ratio with the hydrophilic polyurethane. U.S. Pat. No. 5,763,335 teaches generally hydrophilic foam, but does not teach how to attain a moisture-managing foam that has good compression set resistance and comfort properties.

Polyurethane foams having a combination of thermoformability at elevated temperatures and excellent compression set resistance at room and/or low temperatures, especially together with good shape retention under load or elevated temperature, have not yet been achieved. Similarly, thermoformable foams that are also moisture managing and have excellent cushioning and compression set resistance, have not yet been achieved. Moisture management in this case is defined as the ability of the foam to absorb water (greater than or equal to 50% of its own weight when immersed in water as per ASTM D570) in conjunction with the ability to give up the absorbed water or dry to less than or equal to 20% of the absorbed water in less than or equal to 24 hours. There is accordingly a present need for a polyurethane foam that is both thermoformable with or without moisture managing characteristics and has good compression set resistance, and especially together with shape retention properties.

SUMMARY OF THE INVENTION

The above-described and other deficiencies found in the art are overcome or alleviated by a thermoformable polyurethane foam with excellent low temperature compression set resistance, formed from a composition comprising an isocyanate having a mole average functionality less than or equal to 2.15, an active hydrogen-containing component having a mole average active hydrogen functionality less than or equal to 2.14, a catalyst, and a surfactant.

In another embodiment, a thermoformable polyurethane foam with excellent low temperature compression set resistance and shape retention under load or elevated temperature is formed from a composition comprising an isocyanate having a mole average functionality less than or equal to 2.15, an active hydrogen-containing component having a mole average active hydrogen functionality greater than or equal to 2.065, and less than or equal to 2.14, a catalyst, and a surfactant.

In these embodiments, the molecular weight of the active hydrogen-containing component is preferably selected so as to enhance phase separation of hard and soft segments. The low functionality of the isocyanate results in a foam having little or no cross linking in the hard segment phase, which in turn leads to the formation of defined hard domains that allow the material to be "melted" or to "flow" at elevated temperatures and set as the material is cooled. The foam still possesses structural integrity and good compression set resistance due to the small amount of crosslinking in the soft segment. Preferred thermoforming temperatures to shape the foam are 110° C. to 170° C. When heated to thermoforming temperatures, shaped and then cooled, the strength, or modulus, of the hard segment phase forces the soft segment phase to take and retain the desired shape.

Another embodiment comprises the above-described compositions and thermoformable polyurethane foams with a moisture management system, for example poly(N-vinyl acrylamide) and/or sodium carboxy methylcellulose powder, to increase the water absorption and render the foam moisture managing. Moisture management in these embodiments is surprisingly obtained without use of hydrophilic polyurethanes or use of large amounts of water as a blowing agent.

Another embodiment comprises the above-described thermoformable polyurethane foams and a second polyurethane foam layer integrally bonded thereto. The second layer may be, for example, a slow recovery polyurethane foam or a resilient polyurethane foam, and may optionally be a moisture managing foam.

BRIEF DESCRIPTION OF THE DRAWINGS

Referring now to the drawings, wherein like elements are numbered alike.

DESCRIPTION OF THE PREFERRED EMBODIMENTS

Figure 1A:
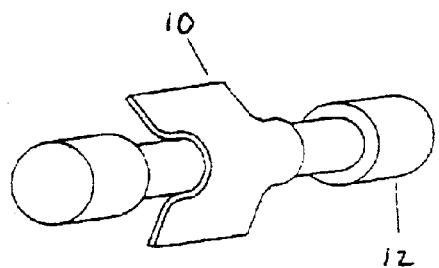
FIG. 1 is a schematic drawing of the apparatus and test conducted to measure thermoformability.

A thermoformable polyurethane foam with excellent compression set resistance is formed from a composition comprising an organic isocyanate component having an average isocyanate (or hard segment) functionality of less than or equal to 2.15, preferably less than or equal to or equal to 2.10, most preferably less than or equal to 2.05. Preferably, the average functionality is greater than or equal to 1.80, preferably greater than or equal to 2.00. The composition further comprises an active hydrogen-containing component having an average functionality of less than or equal to 2.14; a surfactant; and a catalyst. Foams having both thermoformability and excellent shape retention under load and/or elevated temperature may be obtained by limiting the average functionality of the active hydrogen-containing component to greater than or equal to 2.065.

The low functionality of the isocyanate component provides foam having little or no cross-linking in the hard segment phase of the cured foam. This leads to phase separated hard domains that can soften or melt, while the small amount of cross linking in the active hydrogen-containing component results in excellent room temperature compression set resistance and allows the material to maintain structural integrity even when the hard domains deform.

Without the cross linking in the soft segment phase, the compression set resistance is poor. Too much crosslinking results in loss of thermoformability. The amount of soft segment phase cross linking is adjusted to obtain the desired thermoformability at a certain elevated temperature while maintaining good room temperature and low temperature compression set resistance and shape retention characteristics. In this way, the desired balance of thermoformability and shape retention characteristics can be adjusted for different application requirements.

The organic isocyanate components preferably are those having the general formula:

wherein i corresponds to the hard segment functionality described above, and Q is an organic radical having the valence of i. Q can be a substituted or unsubstituted hydrocarbon group (i.e., an alkylene or an arylene group). Q can be a group having the formula $Q^1$—Z—$Q^1$ wherein $Q^1$ is an alkylene or arylene group and Z is —O—, —O—$Q^1$—, —CO—, —S—, —SO—, —SO—$Q^1$—S—, —S—$Q^1$—S—, or —$SO_2$—. Examples of such compounds include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl) methane, chlorophenylene diisocyanates, diphenylmethane-4,4'-diisocyanate (also known as 4,4'-diphenyl methane diisocyanate, or MDI), naphthalene-1,5diisocyanate, and mixtures of such diisocyanates.

Q can also represent a polyurethane radical having a valence of i in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of 30 percent to 200 percent stoichiometric excess, the stoichiometry being based upon equivalents of isocyanate group per equivalent of hydroxyl in the polyol. A preferred prepolymer type of isocyanate for the current invention is Mondur PF, which is a urethane modified prepolymer sold by Bayer Corporation.

Further included among useful polyisocyanates are dimers and trimers of isocyanates and diisocyanates and polymeric diisocyanates such as those having the general formula:

in which i is an integer of one or more, j is an integer of two or more, and $Q^2$ is a polyfunctional organic radical. An example is polymethylene polyphenyl isocyanate. $Q^2$ may also be a compound of the general formula:

in which i is one or more and L is a monofunctional or polyfunctional atom or radical. Examples of this type include ethylphosphonic diisocyanate, $C_2H_5P(O)(NCO)_2$, phenylphosphonic diisocyanate, $C_6H_5P(O)(NCO)_2$, compounds containing a trivalent siliconcyanate group, isocyanates derived from sulfonamides ($QSO_2NCO$), cyanic acid, and thiocyanic acid. Combinations of all of the foregoing may also be used. In general, the aromatic polyisocyanates are preferred because of their greater reactivity.

Of course, a blend of any of the foregoing isocyanate may be used, as long as the total mole average isocyanate functionality is within the specified range. A preferred isocyanate is pure 4,4' MDI or a modified pure MDI. The amount of polyisocyanate employed will vary slightly depending upon the nature of the polyurethane being prepared. In general, the total—NCO equivalent to total active hydrogen equivalent should be such as to provide a ratio of 0.8 to 1.1 equivalents of—NCO per equivalent of active hydrogen, e.g., hydroxyl hydrogen, of the active hydrogen reactant, and preferably a ratio of 1.0 to 1.04 equivalents of—NCO per active hydrogen.

The active hydrogen-containing component generally includes a mixture of polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391; British Pat. No. 733,624); polyalkylene ether glycols (U.S. Pat. No. 2,808, 391; British Pat. No. 733,624); polyalkylenearylene ether glycols (U.S. Pat. No. 2,808,391); and polyalkylene ether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1, 1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2hydroxypropoxy)-1,2-propanediol, 2,4-dimethyl-2-(2-hydroxyethoxy)-methlypentanediol-1,5,1,1,1-tris[2-hydroxyethoxy)methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, and the like. The alkylene oxides employed in producing polyoxyalkylene polyols normally have 2 to 4 carbon atoms. Propylene oxide and mixtures or propylene oxide with ethylene oxide are preferred. The polyols listed above can be used per se as the active hydrogen compound.

A preferred class of polyether polyols is represented generally by the following formula R[(OCH$_n$H$_{2n}$)$_z$OH]$_a$ wherein R is hydrogen or a polyvalent hydrocarbon radical; a is an integer (i.e., 1 or 2 to 6 to 8) equal to the valence of R, n in each occurrence is an integer of 2 to 4 inclusive (preferably 3) and z in each occurrence is an integer having a value of 2 to 200, preferably of 15 to 100.

Preferred polyhydroxyl-containing materials are the polyester polyols, which comprise aromatic polyester polyols based on phthalic anhydride, polymers of cyclic esters, and aliphatic polyester polyols based on diethylene glycol and adipic acid. Especially preferred polyhydroxyl-containing materials are the aromatic polyester polyols and caprolactone based polyester polyols. It has been unexpectedly discovered that the polyester polyol, in addition to the polyether polyol, produces enhanced phase separation and formation of distinct hard domains. Other polyols or additives that enhance phase separation, e.g., polybutadiene polyols may be used.

The preferred amount of phase separating polyol or additive is typically less than or equal to 50% by weight of polyol component, preferably less than or equal to 40%, and most preferably less than or equal to 30%.

In a particularly preferred embodiment, the polyol component comprises one or a mixture of a low molecular weight diol, including but not being limited to dipropylene glycol and 2-methyl-1,3-propanediol; one polypropylene oxide triol having a molecular weight of 2000 to 4000; one or a mixture of a aromatic phthalic anhydride-based polyester diol having a molecular weight in the range of 400 to 600.

The polyol or polyol mixture can have hydroxyl numbers that vary over a wide range. In general, the hydroxyl numbers of the polyols or mixtures thereof, including other cross-linking additives, if employed, can be from 28 to 1000, and higher, preferably 50 to 800.

The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives used in the invention. The hydroxyl number can also be defined by the equation:

$$OH = \frac{56.1 \times 1000 \times f}{M.W.}$$

wherein OH is the hydroxyl number of the polyol, $f$ is the average functionality, that is average number of hydroxyl groups per molecule of polyol, and M.W. is the average molecular weight of the polyol.

The exact polyol or polyols employed depends upon the desired degree of thermoformability and compression set resistance. Variation in the polyol component can also yield a wide range of moduli and toughness. The total polyol mixture and any additives therein preferably possess a total average hydroxyl number of 75 to 200 or more when employed in flexible foam formulations. Typical total average hydroxyl numbers used in these examples is 155 to 165. Such limits are not intended to be restrictive, but are merely illustrative of the large number of possible combinations of the polyols that can be employed.

When foams are produced using this invention, a wide variety of surfactants can be employed for purposes of stabilizing the froth, organosilicone surfactants being preferred. A preferred organosilicone surfactant is a copolymer consisting essentially of SiO$_2$ (silicate) units and (CH$_3$)$_3$SiO$_{0.5}$ (trimethylsiloxy) units in a molar ratio of silicate to trimethylsiloxy units of 0.8:1 to 2.2:1, preferably 1:1 to 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages. Additionally, conventional organopolysiloxane-polyoxyalkylene block copolymers such as those described in U.S. Pat. Nos. 2,834,748, 2,846,458, 2,868,824, 2,917,480 and 3,057,901 can be employed. The amount of the organosilicone polymer employed as a foam stabilizer in this invention can vary over wide limits, e.g., 0.5 to 10 weight percent or greater based on the weight of the active hydrogen component. Preferably, the amount of organosilicone copolymer present in the foam formulations varies from 1.0 to 6.0 weight percent on the same basis.

Catalysts include various inorganic metal compounds and metal compounds that include certain organic groups. Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine) diacetyl acetylacetonato nickel, and the like. Ferric acetylacetonate is particularly preferred, due to its relative stability, good catalytic activity, and lack of toxicity. The metal acetylacetonate is most conveniently added by predissolution in a suitable solvent such as dipropylene glycol or other hydroxyl containing compound which will then participate in the reaction and become part of the final product.

Added to the metal acetyl acetonate is acetyl acetone (2,4-pentanedione), as disclosed in commonly assigned U.S. Pat. No. 5,733,945 to Simpson, which is incorporated herein by reference. It has been discovered that the acetyl acetone can be used to delay or inhibit the normally reactive metal acetyl acetonate at the lower temperatures needed to achieve proper mixing and casting. In other words, the acetyl acetone provides heat latency, which allows time for the required mixing, casting, and other procedures, and avoids deleterious premature curing during low temperature processing. However, as the material is cured in the several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set resistance. In general, the ratio of metal acetyl acetonate to acetyl acetone is 2:1 on a weight basis. The amount of catalyst present in the liquid phase is preferably in the range of 0.03 to 3.0 weight percent based on the weight of the active hydrogen-containing compound.

Other, optional additives may be added to the polyurethane froth mixture in the manufacturing process. For example, conventionally used additives such as fillers (alumina trihydrate, silica, talc, calcium carbonate, clay, and the like), dyes, pigments (for example titanium dioxide and iron oxide) and the like can be used. Use of hindered amine light stabilizers further imparts UV resistance. Appropriate selection of anti-oxidant yields improved high temperature resistance and scorch resistance, which is useful during the thermoforming process. Some preferred antioxidants are phenolic-based such as BHT, Irganox 1135, and the like and amine-based such as Irganox 5057. Especially preferred is a combination of IRGANOX 1135 and IRGANOX 5057. Effective quantities are 0.10 to 0.30 weight percent antioxidant, preferably 0.12 to 0.20 weight percent based on the total weight of the polyol components.

The foams may be frothed using chemical blowing agents, but are preferably manufactured by mechanical frothing with an inert gas. Small amounts of an auxiliary blowing agent can be employed. For example, high boiling fluorocarbons, e.g., boiling above 40° C. can be used. Specific fluorocarbons include for example 1,1,2-trichloro-1,2,2-trifluoroethane and isomers of tetrachlorodifluoroethane, tetrachloromonofluoroethane, and the like. Other auxiliary blowing agents, such as small amounts of water, although it is not necessary, can be employed for purposes of providing an added expansion during heat curing in those cases where such added expansion is desired.

The gas phase of the froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide, and even fluorocarbons, which are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than or equal to 100 to 200 p.s.i.g. It is significant, however, to note that conventional, readily available, mixing equipment is used and no special equipment is necessary. The amount of inert gas beaten into the liquid phase should be adequate to provide a froth having a density at ambient atmospheric pressure of less than or equal to 45%, preferably less than or equal to 35%, of the density of the liquid phase prior to frothing. The mechanical beating is conducted over a period of a few seconds to one minute in an Oakes mixer, or of 3 to 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., 20° C. to 70° C.

The density of the cured foams is generally 10 to 40 pcf, preferably 15 to 20 pounds per cubic foot (pcf).

The thermoformable foams of this invention have a thermoforming factor (TForm factor) of 0.5 or greater, and more preferably 0.7 or greater, where a Tform factor of 1.0 defines a perfectly thermoformable material. A method for determining the Tform factor is set forth below.

The most preferred foams additionally have a recovery factor of 0.4 or greater, and more preferably 0.5 or greater, as measured by the procedure described below. The recovery factor relates to the shape retention of a formed material after the material has been under a compressive force or an elevated temperature (50° C.) for a period of time. The pressure is removed or the material is cooled and allowed to relax before the recovery factor is measured. A recovery factor equal to the Tform factor defines a material that returns to its original thermoformed shape. Although the recovery factor is never greater than or equal to the Tform factor, the higher the recovery factor, the better the retention of the shape rendered during thermoforming.

The compression set resistance of the present foams is 0 to 30%, preferably less than or equal to 10% at room temperature, and 10 to 30% at 50° C. Compression set resistance is the amount, measured in percent, by which a standard test piece of foam fails to return to its original thickness after being subjected to a 50% compression for 22 hours at the appropriate temperature.

In another embodiment, the thermoformable elastomers are used in a multi-layer, preferably dual layer, construction comprising a thermoformable polyurethane elastomer layer and at least one second polyurethane layer, wherein the second polyurethane layer may be a soft foam or elastomer, a slow recovery foam or elastomer, a non-resilient foam or elastomer, a moisture managing foam or elastomer, or a resilient foam such as PORON®, to create a variety of performance features for such uses as footwear, sound absorption, and safety applications. As used herein "slow recovery polyurethane" means polyurethanes, particularly foams, having a time to 90% recovery of greater than or equal to 0.25 seconds after compression to 50% of its original thickness and held for 15 seconds (for example 92 grade PORON® elastomer) and/or a loss factor (RDA) of greater than or equal to 0.5 at room temperature. Slow recovery polyurethanes typically exhibit significant dependence of their modulus or stiffness on the temperature and/or especially the frequency, or velocity of impact compression. This produces excellent comfort in many applications by providing a very soft feel yet excellent energy absorption during impacts.

In contrast to slow recovery polyurethanes, resilient foams or elastomers as used herein means foams or elastomers that recover from compression more quickly. This feature results in these materials providing excellent cushioning by their resilient behavior, which returns most of the energy applied to them rather than absorbing it. Resilient polyurethanes, particularly foams, thus means polyurethanes having a time to 90% recovery of less than or equal to 0.25 seconds and/or a loss factor (RDA) of less than or equal to 0.5. Slow recovery and resilient polyurethanes are also formed from compositions comprising an organic isocyanate component reactive with an active hydrogen-containing component, and a catalyst as defined above. Methods and formulations for the formation of resilient polyurethane elastomers are disclosed, for example, in U.S. Pat. No. 5,973,016 and 5,922,781.

One method of manufacture of the multi-layer composite comprises casting an uncured (wet) polyurethane composition onto a cast, uncured (wet) polyurethane composition, then curing the composite compositions as described in U.S. application Ser. No. 09/892,899, file Jun. 27, 2001 by the Assignee hereof. Such elastomers are integrally bonded, well adhered, and do not readily delaminate. An adhesive is not required. Another method of manufacture of the dual layer composite comprises casting an uncured (wet) polyurethane composition onto a cast, cured (dry) polyurethane composition, then curing the composite elastomer compositions as described in U.S. Pat. No. 5,859,081. Yet another method of manufacture of the dual layer elastomer comprises laminating the individual elastomer layers together generally by using adhesives. Of course, multi-layer constructions comprising more than two layers are also within the scope of the present invention.

In yet another embodiment, the thermoformable foam further comprises a moisture management system. Moisture management is particularly important in footwear applications for comfort. The thermoformable foam formulations described above absorb low amounts of water, i.e., less than or equal to 50% when tested per ASTM D570. It has been found that addition of suitable additives can provide moisture managing foams, wherein moisture managing is defined as exhibiting a water absorption value of greater than or equal to 50% and drying to less than or equal to 20% of water absorbed, under ambient conditions, in less than or equal to 24 hours.

Surprisingly, use of certain additives results in moisture management without the need to resort to the hydrophilic polyurethanes or large amounts of water as a blowing agent as disclosed in much of the prior art, and without significantly adversely affecting the thermoformability, shape retention, compression set resistance, and cushioning properties of the base thermoformable foam. In addition, such additives provide a mechanism for desorption of moisture. Unlike other water scavenging additives such as molecular sieves, the additives below allow for not only absorption of moisture, but also the desorption or drying of the moisture, which is critical in many applications. For example, in the footwear industry as it relates to the ability of an insole material to absorb, or store excess moisture from body fluids or other moisture and to release the moisture when not in use, to provide improved comfort to the wearer.

Suitable additives include sodium carboxy methyl cellulose, wood powder, corn starch, poly(N-vinyl acrylamide), potassium acrylates, sodium acrylates, calcium carbonate, and mixtures comprising at least one of the foregoing moisture management additives. A preferred additive is sodium carboxy methyl cellulose (NaCMC) available under the trade name PE29XLX-3 from S&G Resources, or Finnifix 700P or Cekol 700P from Noviant BV. The level of water absorption can be tailored with the amount of moisture managing additive used. Usually only small quantities are required to provide greater than or equal to 50% water absorption under ambient conditions in less than or equal to 24 hours, generally 1 to 20 wt %, and preferably 5 to 15 wt % of the total formulation.

The present thermoformable polyurethane foam provides a product superior to those found in the art by offering the advantages of thermoformability, excellent compression set resistance, shape retention, breathability, moisture management ability and flexibility. Importantly, the shape retention under load or elevated temperature and room temperature compression set resistance of the present thermoformable polyurethane foam provide significant advantages over prior art thermoformable foams. The subject foams are thus useful for a wide variety of applications, such as footwear insoles, inner pads for safety equipment, speaker edges, and medical equipment padding.

Other additives may also be used, for example bactericides and/or odor elimination additives.

All references and patents cited herein are incorporated by reference. The polyurethane foams are further described by the following non-limiting examples:

EXAMPLES

Chemicals, sources, and descriptions are listed in Table 1 below.

TABLE 1

| Trade Name | Source | Description |
| --- | --- | --- |
| PPG 2000/2025 | Bayer Corp | Polypropylene ether based polyether diol, MW = 2000 g/mole |
| PPG 425 | Bayer Corp | Polypropylene ether based polyether diol, MW = 425 g/mole |
| MPDiol | — | 2-methyl-1,3-propane diol (chain extender) |
| LG 56 | Bayer Corp. | Polypropylene ether based polyether triol, MW = 3000 g/mole. |

TABLE 1-continued

| Trade Name | Source | Description |
|---|---|---|
| TONE 0201 | Union Carbide | Polycaprolactone-based polyester diol, MW = 500 g/mole. |
| Stepanpol PS2402 | Stepan Chemical Company | Ortho phthalate-diethylene glycol based polyester polyol, MW = 560 g/mole. |
| DPG | — | Dipropylene glycol (diol chain extender) |
| LHT 112 | Bayer Corp | Polypropylene ether based polyether triol, MW = 1500 g/mole. |
| LHT 240 | Bayer Corp | Polypropylene ether based polyether triol, MW = 2000 g/mole. |
| CEKOL 700P | Noviant BV | Sodium carboxy methyl cellulose |
| PE29XLX-3 | S&G Resources | Sodium carboxy methyl cellulose |
| PNVA NA010F | Showa Denko | Poly(N-vinyl acrylamide) |
| L-5617 | Crompton/Osi | Silicone-based surfactant |
| Alumina | — | Aluminum trihydrate (flame retardant filler) |
| Calcium Carbonate | — | Filler |
| 3A Sieve | U.O.P. | Alkali metal alumino silicate, $K_{12}[(AlO_2)_{12}(SiO_2)_{12}] \cdot XH_2O$ (water absorption) |
| IRGANOX 1135 | Ciba | Hindered phenol (antioxidant) |
| IRGANOX 5057 | Ciba | Aromatic amine (antioxidant) |
| BHT | Naugard | Butylated hydroxytoluene (antioxidant) |
| Catalyst | — | 0.25 wt % Ferric acetyl acetonate and 0.75 wt % acetyl acetone in polyol |
| Baytuft 751 | Bayer | Polymeric diphenyl methane diisocyanate, % NCO = 27.6, average functionality = 2.2 |
| Mondur PF | Bayer | Urethane-modified isocyanate prepolymer, % NCO = 23.0, average functionality = 2.0 |

For each foam, all components except for the isocyanate were mixed and placed in a holding tank with agitation and under dry nitrogen in the amounts shown in Tables 2 to 6 below. All parts are by weight unless otherwise indicated. This mixture was then pumped at a controlled flow rate to a high shear mixing head of the Oakes type. The isocyanate mixture, were also separately pumped into the mixing head at controlled flow rates and at the proper flow ratios relative to the polyols mixture flow rate. Flow meters were used to measure and adjust the flow rates of the various raw material streams. Dry air was introduced into the mix head using a gas flow rate controller to adjust the airflow rate to produce a material of the desired final density. After mixing and foaming in the high shear mixer, the materials were pumped through flexible hoses and out through rigid nozzles. The foam was then cast onto coated release paper that had been dried just prior to the point where the foam was introduced. This prevented any water that might have been in the paper from participating in the reaction. The release paper was 13 inches wide and was drawn through the machine at a controlled speed, in this case at 10 feet per minute (FPM). The paper and cast foam then passed under a knife over plate (KOP) coater. The KOP spread the foam and was used to control the thickness of the final product.

The coated release paper then passed through a curing section consisting of heated platens kept at 250° F. to 375° F. by a series of thermocouples, controllers and heating elements. A series of upper platens were kept at 450° F. The cured product then passed through an air-cooling section, a series of drive rollers and was wound up on a take-up roll.

Compression set was determined by measuring amount in percent by which a standard test piece of the foam fails to return to its original thickness after being subjected to a 50% compression for 22 hours at the specified temperature.

Figure 1B:
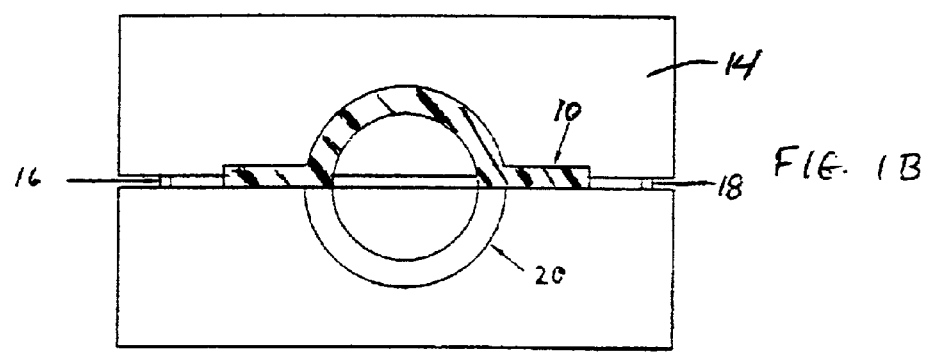
Figure 1C:
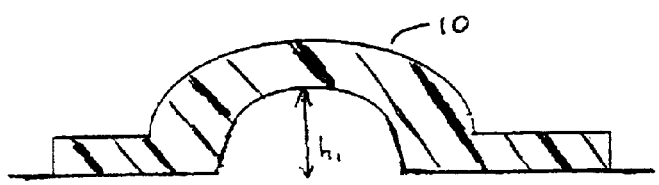
Figure 2:
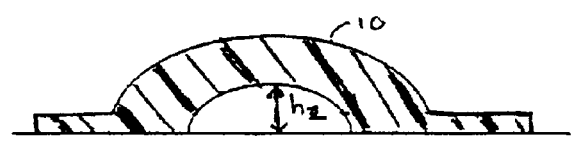
FIG. 2 is a schematic drawing of the apparatus and test conducted to measure the shape retention of the elastomer after it has been subjected to load.
Figure 3:
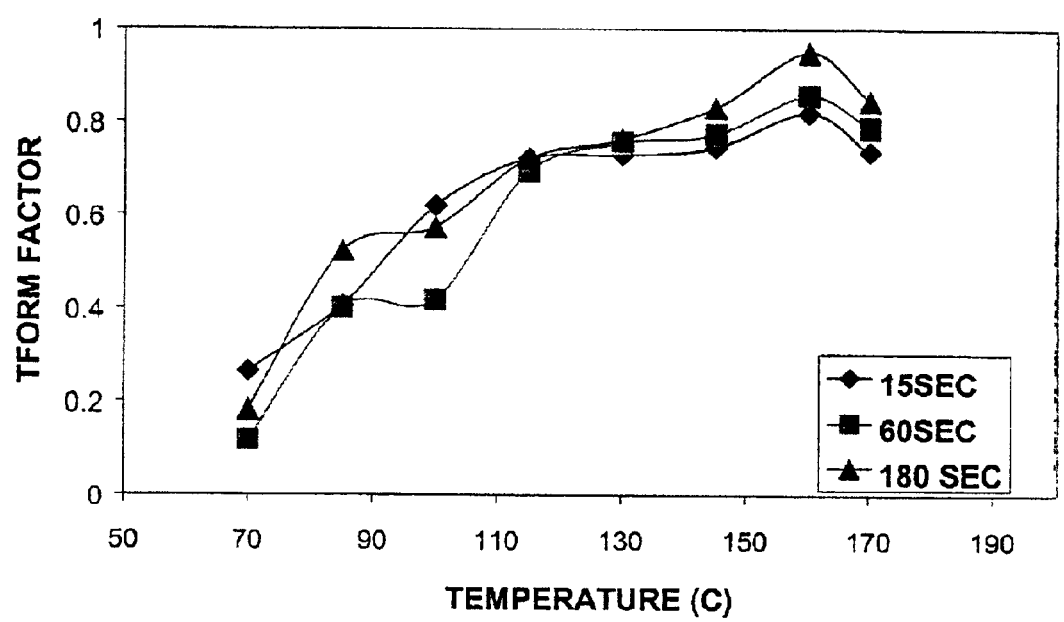
FIG. 3 shows a time-temperature study to evaluate the thermoforming conditions on a thermoformable material compressed to 50% while forming.

Tform factor was determined using the apparatus and method shown in FIGS. 1A to 1C. A straight strip of elastomer having no curvature 10 is first formed, and partially wrapped around a stainless steel rod 12 having a radius of 0.625 inches. Elastomer 10 and rod 12 are then placed in a two-part mold 14 having insert 20 in the bottom portion, along with shims 16, 18 such that when the mold is closed, the elastomer is compressed by a pre-determined amount. Mold 14 is then closed and heated for a fixed period of time, the mold is opened, and the strip of elastomer is removed. The strip is then held at room temperature for 30 minutes. The height of the highest portion of the curve (as shown in FIG. 1C) is then measured and designated $h_1$. The thermoforming factor or TForm factor is calculated as $h_1$ divided by 0.625.

To determine the recovery factor, the strip of elastomer thermoformed as in FIGS. 1A to 1B is placed on a flat table and a weight effective to provide a pressure of 15 pounds per square inch is placed on the entire elastomer for 24 hours under ambient conditions. The weight is removed, the sample is allowed to relax for 30 minutes, and the height at the highest portion of the curve is measured and designated $h_2$. The recovery factor is calculated as $h_2$ divided by 0.625. The recovery factor can also be calculated by placing the shaped strip into a 50° C. oven without any load for 24 hours or any specified period of time and then cooling to room temperature, followed by measuring height $h_2$ to evaluate the relaxation of the foam shape with heat.

The effect of varying isocyanate functionality is set forth in Table 2.

TABLE 2

| | Sample Number | | | | |
|---|---|---|---|---|---|
| | A | B | C | D | E |
| Component | | | | | |
| TONE 0201 | 15 | 15 | 15 | 15 | 15 |
| MPDiol | 0.8 | 0.8 | 0.8 | 0.8 | 0.8 |
| L-5617 | 3 | 3 | 3 | 3 | 3 |
| CATALYST | 6 | 6 | 6 | 6 | 6 |
| ALUMINA | 20 | 20 | 20 | 20 | 20 |
| 3A SIEVE | 2 | 2 | 2 | 2 | 2 |
| DPG | 10 | 10 | 10 | 10 | 10 |
| LG 56 | 43.23 | 43.23 | 43.23 | 43.23 | 43.23 |
| Mondur PF | 51.65 | 38.74 | 25.83 | 12.91 | 0 |
| BAYTUFT 751 | 0 | 12.91 | 25.83 | 38.74 | 51.65 |
| OH# | 155 | 155 | 155 | 155 | 155 |
| $M_C$ | 15197 | 8887 | 6321 | 4924 | 4052 |
| FUNCTIONALITY | | | | | |
| Soft Segment | 2.09 | 2.09 | 2.09 | 2.09 | 2.09 |
| Hard Segment | 2 | 2.05 | 2.1 | 2.15 | 2.2 |
| Tform Factor | 0.96 | 0.5 | 0.53 | 0.47 | 0.06 |

As may be seen from the above data, it is apparent from columns A through E that the thermoformability is adversely affected when the isocyanate functionality increases significantly above 2.0. This shows that the isocyanate functionality should less than or equal to 2.15 and preferably less than or equal to 2.05 to yield good thermoformability. The compression set resistance of sample A was 3% at room temperature and 16% at 50° C.

Table 3 demonstrates the importance of soft segment crosslinking on the thermoformability and shape retention. The soft segment crosslinking is represented both by the soft segment functionality as well as the $M_c$, which is the molecular weight between crosslinks.

TABLE 3

| Component | F | G | H | I | J | K | L | M |
|---|---|---|---|---|---|---|---|---|
| L-5617 | 3 | 3 | 3 | 3 | 3 | 3 | 3 | 3 |
| ALUMINA | 20 | 20 | 20 | 20 | 20 | 20 | 20 | 20 |
| 3A SIEVE | 2 | 2 | 2 | 2 | 2 | 2 | 2 | 2 |
| CATALYST | 6 | 6 | 6 | 6 | 6 | 6 | 6 | 6 |
| IRGANOX 1135 | 0.12 | 0.12 | 0.12 | 0.12 | 0.12 | 0.12 | 0.12 | 0.12 |
| IRGANOX 5057 | 0.03 | 0.03 | 0.03 | 0.03 | 0.03 | 0.03 | 0.03 | 0.03 |
| TONE 0201 | 15 | 15 | 15 | 15 | 15 | 15 | 15 | 15 |
| MPDiol | 0.8 | 0.8 | 0.8 | 0.8 | 0.8 | 0.3 | 0.3 | 0 |
| DPG | 10 | 10 | 10 | 10 | 10 | 10 | 9 | 4.5 |
| PPG 2025/2000 | 20.05 | 10.5 | 0 | 0 | 0 | 17.37 | 17.37 | 22.17 |
| LG 56 | 23 | 32.55 | 43.23 | 45.9 | 60 | 12 | 0 | 0 |
| LHT 112 | 0 | 0 | 0 | 0 | 0 | 18 | 30 | 0 |
| LHT 240 | 0 | 0 | 0 | 0 | 0 | 0 | 0 | 30 |
| Mondur PF | 51.53 | 51.57 | 51.65 | 50.65 | 46.87 | 52.02 | 51.43 | 51.32 |
| RATIO | 1.02 | 1.02 | 1.02 | 1.02 | 1.02 | 1.02 | 1.02 | 1.02 |
| OH# | 155 | 158 | 158 | 155 | 158 | 158 | 158 | 157 |
| $M_c$ | 35175 | 21682 | 15197 | 14120 | 11763 | 11603 | 8495 | 3723 |
| FUNCTIONALITY | | | | | | | | |
| Soft Segment | 2.041 | 2.065 | 2.093 | 2.100 | 2.13 | 2.140 | 2.196 | 2.339 |
| Hard Segment | 2 | 2 | 2 | 2 | 2 | 2 | 2 | 2 |
| Tform Factor | 0.9 | 0.7 | 0.8 | 0.8 | 0.9 | 0.4 | 0 | 0 |
| Recovery Factor | 0.2 | 0.1 | 0.7 | 0.6 | 0.4 | 0.0 | 0.2 | 0 |

All of the samples measured had good compression set resistance (<5%) measured at room temperature. As seen from columns F through M in Table 3, for these formulations, an $M_c$ greater than or equal to 11600 or a soft segment functionality of less than or equal to 2.14 yields high thermoformability (TF Factor>0.7), which implies that a high level of soft segment crosslinking inhibits thermoformability. Even more surprising is that the recovery factor, which determines the shape retention of thermoformed material, is improved with soft segment functionalities greater than or equal to 2.065 ($M_c$<21,700). These functionalities are specific to the choice of raw materials used here. Different raw materials may result in a shift in the optimal functionality. In general, this discovery implies that the thermoformability and shape retention can be controlled in any formulation through an optimum balance of soft and hard segment crosslinking.

TABLE 4

| COMPONENT | N | O | P |
|---|---|---|---|
| L-5617 | 3 | 3 | 3 |
| ALUMINA | 20 | 20 | 20 |
| 3A SIEVE | 2 | 2 | 2 |
| CATALYST | 6 | 6 | 6 |
| IRGANOX 1135 | 0.12 | 0.12 | 0.12 |
| IRGANOX 5057 | 0.03 | 0.03 | 0.03 |
| TONE 0201 | 0 | 15 | 0 |
| STEPANPOL PS 2402 | 0 | 0 | 15 |
| PPG 425 | 15 | 0 | 0 |
| MPDiol | 0.8 | 0.8 | 0.8 |
| DPG | 10 | 10 | 10 |
| LG 56 | 43.23 | 43.23 | 43.23 |
| Mondur PF | 53.40 | 51.65 | 53.40 |
| RATIO | 1.02 | 1.02 | 1.02 |
| OH # | 160 | 155 | 160 |
| $M_c$ | 15475 | 15299 | 15475 |
| Tform Factor | 0.1 | 0.8 | 0.7 |

TABLE 4-continued

| | N | O | P |
|---|---|---|---|
| Recovery Factor | 0 | 0.6 | 0.5 |
| 25° C. C-set (%) | 3 | 3 | 3 |
| 50° C. C-set (%) | 3 | 16 | 10 |

Table 4 shows that phase separating polyols such as polyester polyols can contribute to attaining thermoformability (compare samples N and O). Sample P indicates that aromatic polyester polyol can also be used to make thermoformable foams and can result in better compression set resistance at elevated temperature.

Table 5 has examples that show various combinations of thermoformability, moisture management, and dual layer construction, wherein moisture management has been imparted through the addition of NaCMC.

TABLE 5

| | Q | R | S | T |
|---|---|---|---|---|
| Type of Foam | TF | TF-MM | TF-MM/R-MM | TF-MM/NR-MM |
| Single/Dual Layer | Single | Single | Dual | Dual |
| Resiliency | Res | Res | Res | Combined |
| Tform Factor | 0.8 | 0.8 | 0.7 | 0.7 |
| Recover Factor | 0.7 | 0.7 | 0.6 | 0.6 |
| Water Absorption (%) | 15 | 257 | 257 | 300 |

TF = Thermoformable; MM = Moisture Managing;
R = Resilient; NR = Non-resilient

Samples Q and R are thermoformable and thermoformable with moisture management respectively. S and T represent dual layer versions of moisture managing thermoformable foams with moisture managing resilient and non-resilient foams respectively. It is to be understood that the moisture management system may be present in the thermoformable layer, another layer of the dual layer, or both the thermoformable and other layer. More than one layer (in addition to the thermoformable layer) may be present.

The effects of using various moisture management systems are shown in Table 6.

TABLE 6

|  | Sample Number | | | |
| --- | --- | --- | --- | --- |
|  | U | V | W | X |
| Additive | NaCMC | Ca(CO$_3$) | PNVA | NaCMC/Ca(CO$_3$) |
| Parts in polyol mix | 11 | 20 | 20 | 20 |
| Compression set resistance (%) | <5% | <5% | <5% | <5% |
| Water Absorption (%) | 341 | 73 | 135 | 205 |

Table 6 shows the use of NaCMC, poly(N-vinyl acrylamide) (PNVA), and calcium carbonate separately and in combination as moisture managing additives yield different levels of a water absorption of greater than or equal to 50% while retaining compression set resistance values at less than or equal to 5%.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A polyurethane foam formed from a composition comprising:
   an isocyanate-containing component having an average isocyanate functionality less than or equal to 2.15;
   an active hydrogen-containing component having an average functionality less than or equal to 2.14;
   a catalyst; and
   a surfactant, wherein the foam is thermoformable, has a density of 10 to 40 pounds per cubic foot, and a room temperature compression set resistance of less than or equal to 10% after 50% compression for 22 hours.

2. The foam of claim 1, wherein the active hydrogen-containing component has an average functionality greater than or equal to or equal to 2.065.

3. The foam of claim 1, having a thermoformability factor greater than or equal to 0.5.

4. The foam of claim 1, having a recovery factor greater than or equal to 0.4.

5. The foam of claim 1, having a 50° C. compression set resistance of lees than or equal to 30% after 50% compression for 22 hours.

6. The foam of claim 1, having a thermoformability factor greater than or equal to 0.6, a recovery factor greater than or equal to 0.5, and a room temperature compression set resistance of less than or equal to 10% after 50% compression for 22 hours.

7. The foam of claim 1, having a thermoformability factor greater than or equal to 0.6, a recovery factor greater than or equal to 0.5, a room temperature compression set resistance less than or equal to 10%, and a 50° C. compression set resistance of less than or equal to 30% after compression to 50% for 22 hours.

8. The composition of claim 1, wherein the active hydrogen-containing component comprises a polyol.

9. The composition of claim 8, wherein the polyol is a mixture of a polyether polyol and a polyester polyol.

10. The composition of claim 8, wherein the polyester polyol is selected from the group consisting of aromatic polyesters and caprolactone-based polyesters.

11. The composition of claim 8, wherein the polyether polyol is selected from a group consisting of polypropylene ether based polyether triol.

12. The composition of claim 8, wherein the polyether polyol is selected from a group consisting of a mixture of polypropylene ether based polyether triol and diol.

13. The composition of claim 12, further comprising a moisture management system.

14. The composition of claim 1, wherein the average functionality of the isocyanate-containing component is 1.80 to 2.10.

15. The composition of claim 1, wherein the average functionality of the isocyanate-containing component is 2.00 to 2.05.

16. The composition of claim 1, wherein the average functionality of the isocyanate-containing component is 2.00.

17. The composition of claim 1, further comprising a moisture management system.

18. The composition of claim 17, wherein the moisture management system is selected from the group of additives consisting of sodium carboxymethylcellulose, poly(N-vinyl acrylamide), sodium acrylate, potassium acrylate, wood powder, corn starch, calcium carbonate, and mixtures comprising one of the foregoing additives.

19. The composition of claim 18, wherein the moisture management system is selected from the group of additives consisting of sodium carboxymethylcellulose, poly(N-vinyl acrylamide), calcium carbonate, and mixtures comprising one of the foregoing additives.

20. A shoe insert comprising the foam of claim 1.

* * * * *